US011500250B2

(12) United States Patent
Sogabe et al.

(10) Patent No.: US 11,500,250 B2
(45) Date of Patent: Nov. 15, 2022

(54) DISPLAY DEVICE

(71) Applicant: Japan Display Inc., Tokyo (JP)

(72) Inventors: Mitsufumi Sogabe, Tokyo (JP);
Yoshitaka Ozeki, Tokyo (JP);
Nobutaka Ozaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 26 days.

(21) Appl. No.: 17/132,756

(22) Filed: Dec. 23, 2020

(65) Prior Publication Data

US 2021/0116762 A1 Apr. 22, 2021

Related U.S. Application Data

(63) Continuation of application No. 16/277,270, filed on Feb. 15, 2019, now Pat. No. 10,877,322.

(30) Foreign Application Priority Data

Feb. 16, 2018 (JP) .............................. JP2018-026245

(51) Int. Cl.
*G02F 1/1343* (2006.01)
*G02F 1/1362* (2006.01)

(52) U.S. Cl.
CPC .. *G02F 1/134309* (2013.01); *G02F 1/136286* (2013.01)

(58) Field of Classification Search
CPC ......... G02F 1/134309; G02F 1/136286; G02F 1/136227; G09G 2300/0426
See application file for complete search history.

(56) References Cited

U.S. PATENT DOCUMENTS

| RE47,455 E * | 6/2019 | Kim ................. G02F 1/134363 |
| 2008/0186440 A1 | 8/2008 | Lim et al. |
| 2013/0093658 A1 | 4/2013 | Park et al. |
| 2016/0133173 A1 * | 5/2016 | Tsai ................. G02F 1/136286 |
| | | 345/694 |

(Continued)

FOREIGN PATENT DOCUMENTS

| JP | 2008-151880 | 7/2008 |
| JP | 2008-191669 A | 8/2008 |

OTHER PUBLICATIONS

Japanese Office Action dated Nov. 9, 2021 in corresponding Japanese Application No. 2018-026245.

*Primary Examiner* — Angela K Davison
(74) *Attorney, Agent, or Firm* — K&L Gates LLP

(57) ABSTRACT

A display device is provided and includes first signal line between first and second pixel areas in first direction; first switching element in first pixel area, first switching element including first relay electrode in first pixel area; second switching element in second pixel area, second switching element including second relay electrode in second pixel area; first pixel electrode in the first pixel area; and second pixel electrode in second pixel area, wherein first pixel electrode includes first connector, second pixel electrode includes second connector, first and second connectors are arranged in first direction with first signal line interposed therebetween, gap width between first connector and first signal line is different from gap width between first signal line and second connector, and gap width between first relay electrode and first signal line is different from gap width between first signal line and second relay electrode.

24 Claims, 12 Drawing Sheets

(56) References Cited

U.S. PATENT DOCUMENTS

2017/0293191 A1 10/2017 Tomioka et al.
2017/0351153 A1 12/2017 Mochizuki
2018/0321530 A1* 11/2018 Tada ................ G02F 1/136286

* cited by examiner

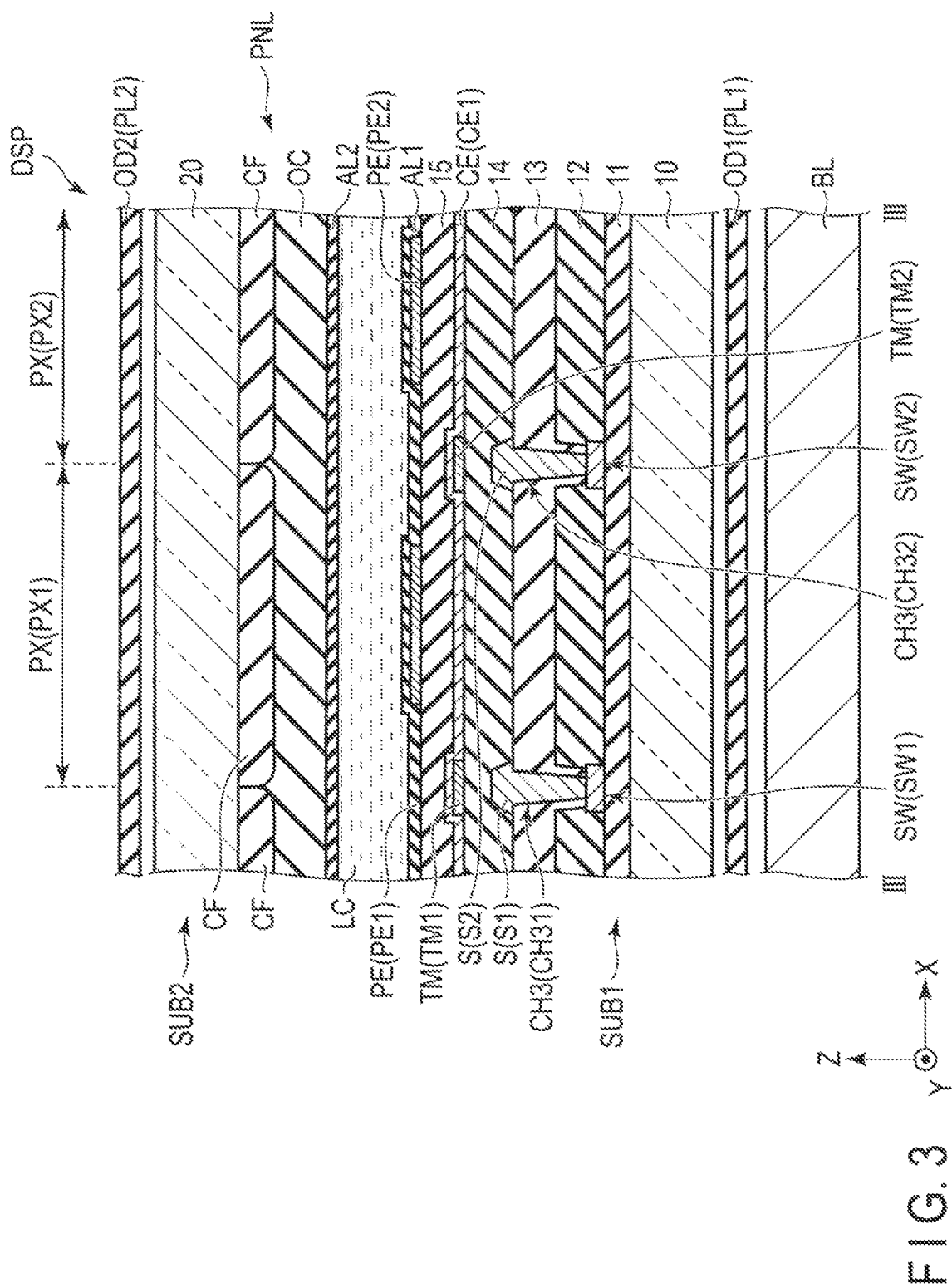
F I G. 3

DISPLAY DEVICE

CROSS-REFERENCE TO RELATED APPLICATIONS

This application is a continuation of U.S. patent application Ser. No. 16/277,270, filed on Feb. 15, 2019, which application is based upon and claims the benefit of priority from Japanese Patent Application No. 2018-026245, filed Feb. 16, 2018, the entire contents of which are incorporated herein by reference.

FIELD

Embodiments described herein relate generally to a display device.

BACKGROUND

In recent years, display devices with higher definition are demanded. As the definition increases, a gap between any two adjacent signal lines narrows in the display devices. Thus, parasitic capacitances are formed between a signal line and two pixel electrodes positioned in the both sides of the signal line, which may affect the display quality.

SUMMARY

The present application generally relates to a display device.

According to one embodiment, a display device including a first signal line positioned between a first and second pixel area, a common electrode, a first and second switching element, a first and second pixel electrode, wherein the first pixel electrode includes a first connector, the second pixel electrode includes a second connector and a second projection, the common electrode includes an opening, the first and second connector are arranged with the first signal line interposed therebetween, the second projection is disposed in the first direction between the first signal line and the second connector, and a first gap is different from a second gap.

BRIEF DESCRIPTION OF THE DRAWINGS

FIG. 3 is a cross-sectional view of an example of the structure of the display device, taken along line III-III of FIG. 2.

DETAILED DESCRIPTION

Figure 1:
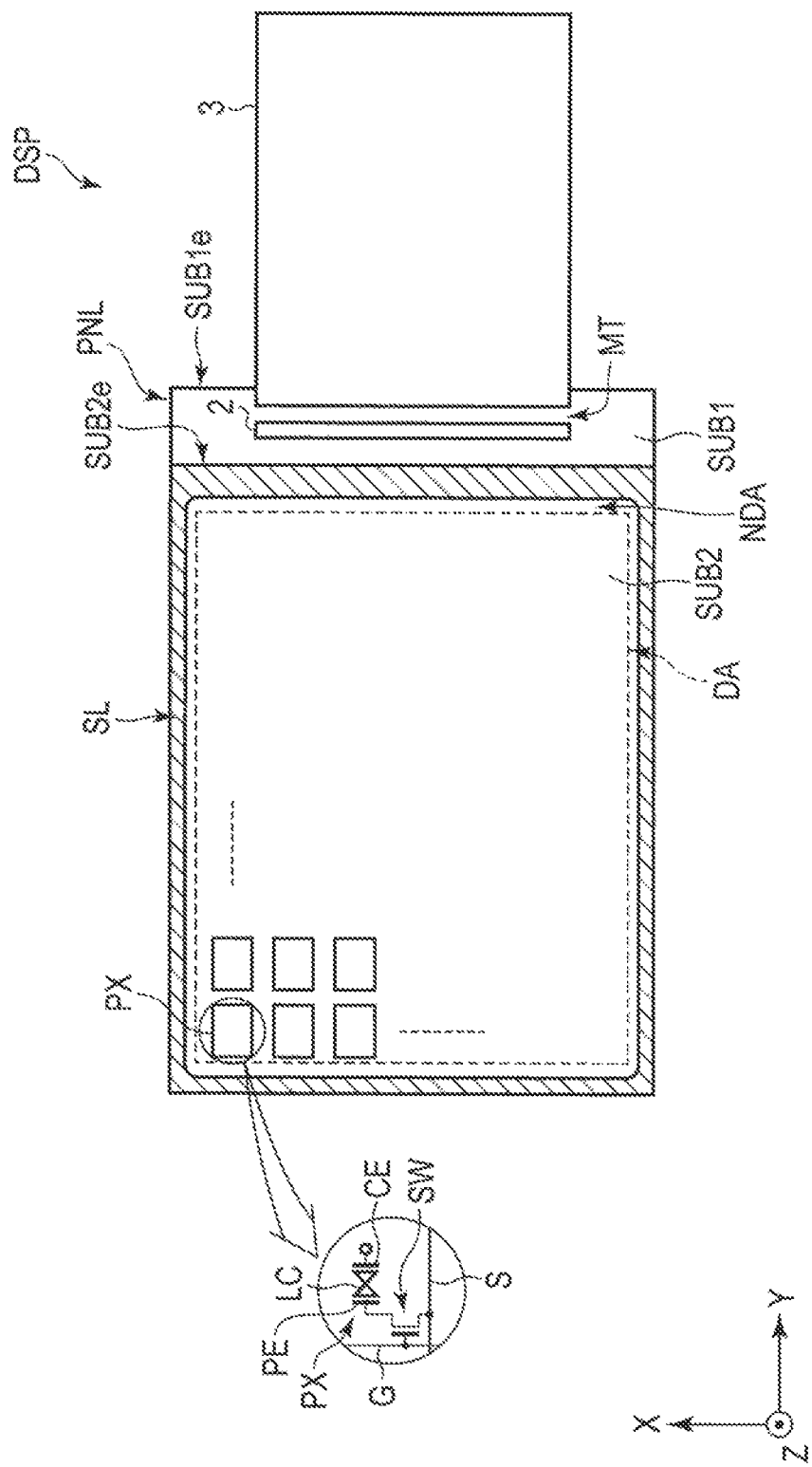
FIG. 1 is a plan view of an example of the structure of a display panel of a display device of an embodiment.

In general, according to one embodiment, a display device comprises: a first signal line positioned between a first pixel area and a second pixel area which are adjacent to each other in a first direction; a common electrode disposed to overlap the first pixel area, the second pixel area, and the first signal line; a first switching element disposed in the first pixel area in a position below the common electrode; a second switching element disposed in the second pixel area in a position below the common electrode; a first pixel electrode disposed in the first pixel area in a position above the common electrode; and a second pixel electrode disposed in the second pixel area in a position above the common electrode, wherein the first pixel electrode includes a first connector connected to the first switching element, a first branch, and a first projection connecting the first branch and the first connector, the second pixel electrode includes a second connector connected to the second switching element, a second branch, and a second projection connecting the second branch and the second connector, the common electrode includes an opening opposed to the first connector and the second connector, the first connector and the second connector are arranged in the first direction with the first signal line interposed therebetween, the first connector is connected to the first switching element through the opening, the second connector is connected to the second switching element through the opening, the second projection is disposed in the first direction between the first signal line and the second connector, and a first gap between the first connector and the first signal line is different from a second gap between the first signal line and the second connector.

According to another embodiment, a display device comprises: a first signal line positioned between a first pixel area and a second pixel area which are adjacent to each other in a first direction; a common electrode disposed to overlap the first pixel area, the second pixel area, and the first signal line; a first switching element disposed in the first pixel area in a position below the common electrode; a second switching element disposed in the second pixel area in a position below the common electrode; a first pixel electrode disposed in the first pixel area in a position above the common electrode; and a second pixel electrode disposed in the second pixel area in a position above the common electrode, wherein the first pixel electrode includes a first connector connected to the first switching element, a first branch, and a first projection connecting the first branch and the first connector, the second pixel electrode includes a second connector connected to the second switching element, a second branch, and a second projection connecting the second branch and the second connector, the common electrode includes an opening opposed to the first connector and the second connector, the first connector and the second connector are arranged in the first direction with the first signal line interposed therebetween, the first connector is connected to the first switching element through the opening, the second connector is connected to the second switching element through the opening, the second projection is disposed in the first direction between the first signal line and the second connector, and a first parasitic capacitance between the first connector and the first signal line is equal to a second parasitic capacitance between the first signal line and the second connector.

Hereinafter, embodiments will be explained with reference to accompanying drawings. Note that, the disclosure is an example, and the contents of the following description do not limit the scope of the invention. Variations which will easily be conceivable by a person having ordinary skill in the art are naturally encompassed within the scope of the invention. In the figures, dimensions of components may be depicted schematically as compared to actual models of the invention for easier understanding. Elements corresponding to each other between different figures will be referred to by the same reference number, and explanation considered redundant may be omitted.

In each embodiment, a display device is a liquid crystal display device. The liquid crystal display device can be used in various devices such as virtual reality (VR) viewer, smartphone, tablet, mobile phone, clamshell computer, in-car device, and gaming consoles.

Embodiment

FIG. 1 is a plan view of an example of the structure of a display panel PNL of a display device DSP of the embodiment. In the figure, a first direction X, second direction Y, and third direction Z are orthogonal to each other; however, they may cross each other at an angle other than 90 degrees. Hereinafter, seeing an X-Y plane defined by the first direction X and the second direction Y in the third direction Z will be referred to as plan view. A direction toward the arrow of the third direction Z will be referred to as above (or up), and a direction opposite to the arrow of the third direction Z will be referred to as below (or down). A length of the first direction X will be referred to as width, and a length of the third direction Z will be referred to as thickness. Furthermore, a direction toward the arrow of the first direction X will be referred to as right, and a direction opposite to the arrow of the first direction X will be referred to as left.

In a plan view, the display panel PNL is formed as, for example, a substantial rectangular. Note that the display panel PNL may be formed as a round shape with round corners. The display panel PNL includes a first substrate SUB1, second substrate SUB2 opposed to the first substrate SUB1, and display function layer (liquid crystal layer LC which will be described later) provided between the first substrate SUB1 and the second substrate SUB2. The first substrate SUB1 and the second substrate SUB2 are adhered together by a sealant SL with a certain gap therebetween. The liquid crystal layer LC is filled in the space surrounded by the first substrate SUB1, the second substrate SUB2 and the sealant SL. The display panel PNL includes a display area DA to display images in the area surrounded by the sealant SL. The display area DA is, for example, a substantial rectangular. Note that the display area DA may be another kind of polygonal, or round. Furthermore, the display panel PNL includes a non-display area NDA outside the display area DA.

The display panel PNL includes a plurality of subpixel areas PX in the display area DA. Here, a subpixel area is a minimum unit which a display can be controlled on the basis of a pixel signal and is disposed in, for example, an area including a switching element disposed in a position where a scan line and a signal line cross, which is described later. Furthermore, a main pixel area includes a plurality of subpixel areas. For example, one main pixel area includes a subpixel area corresponding to red, subpixel area corresponding to green, and subpixel corresponding to blue. In another example, one main pixel area includes a subpixel area corresponding to red, subpixel area corresponding to green, subpixel area corresponding to blue, and subpixel area corresponding to white. The main pixel area corresponds to a minimum unit of an image displayed in the display area DA. The subpixel areas PX are arranged as a matrix in the display area DA.

The display panel PNL include, in the display area DA, a scan line G extending in the first direction X, signal line S extending in the second direction Y, switching element SW electrically connected to the scan line G and the signal line S in each subpixel area PX, pixel electrode PE electrically connected to the switching element SW in each subpixel area PX, and common electrode CE formed over the subpixel areas PX, for example. The pixel electrode PE and the common electrode CE are formed of a transparent material such as indium tin oxide (ITO) or indium zinc oxide (IZO).

The display panel PNL is a transmissive panel which displays an image by selectively passing light from a backlight unit disposed in the rear surface side of the display panel PNL. In addition, the display panel may be a reflective panel which displays an image by selectively reflecting external light on the display area, or may be a transflective panel which is a combination of the transmissive panel and the reflective panel.

Signal supply sources including a driver IC chip 2 and a flexible printed circuit (FPC) 3 which are essential for the drive of the display panel PNL are positioned in the non-display area NDA. The driver IC chip 2 performs a drive method which reverses the polarity between at least subpixel areas PX adjacent to each other in the first direction. In the present embodiment, a column reverse drive is adopted. In addition, as another drive method, a dot reverse drive may be adopted. In the example depicted, the driver IC chip 2 and the FPC 3 are mounted in a mount MT of a first substrate SUB1 extending outward further than a substrate side edge SUB2e of a second substrate SUB2. The mount MT is formed along a substrate side edge SUB1e of the first substrate SUB1. Although this is not depicted, the first substrate SUB1 includes connection terminals (pads) to connect the signal supply sources to the mount MT. The pads include those which are electrically connected to the scan line G and the source line S. Note that, in the example depicted, other three substrate side edges of the second substrate SUB2 are opposed to other three substrate side edges of the first substrate SUB1. Note that the driver IC chip 2 is not limited to the example depicted but may be provided with the FPC substrate 3.

The sealant SL is disposed in the non-display area NDA to surround the display area DA. In the example depicted, the sealant SL is formed in a rectangular shape.

Figure 2:
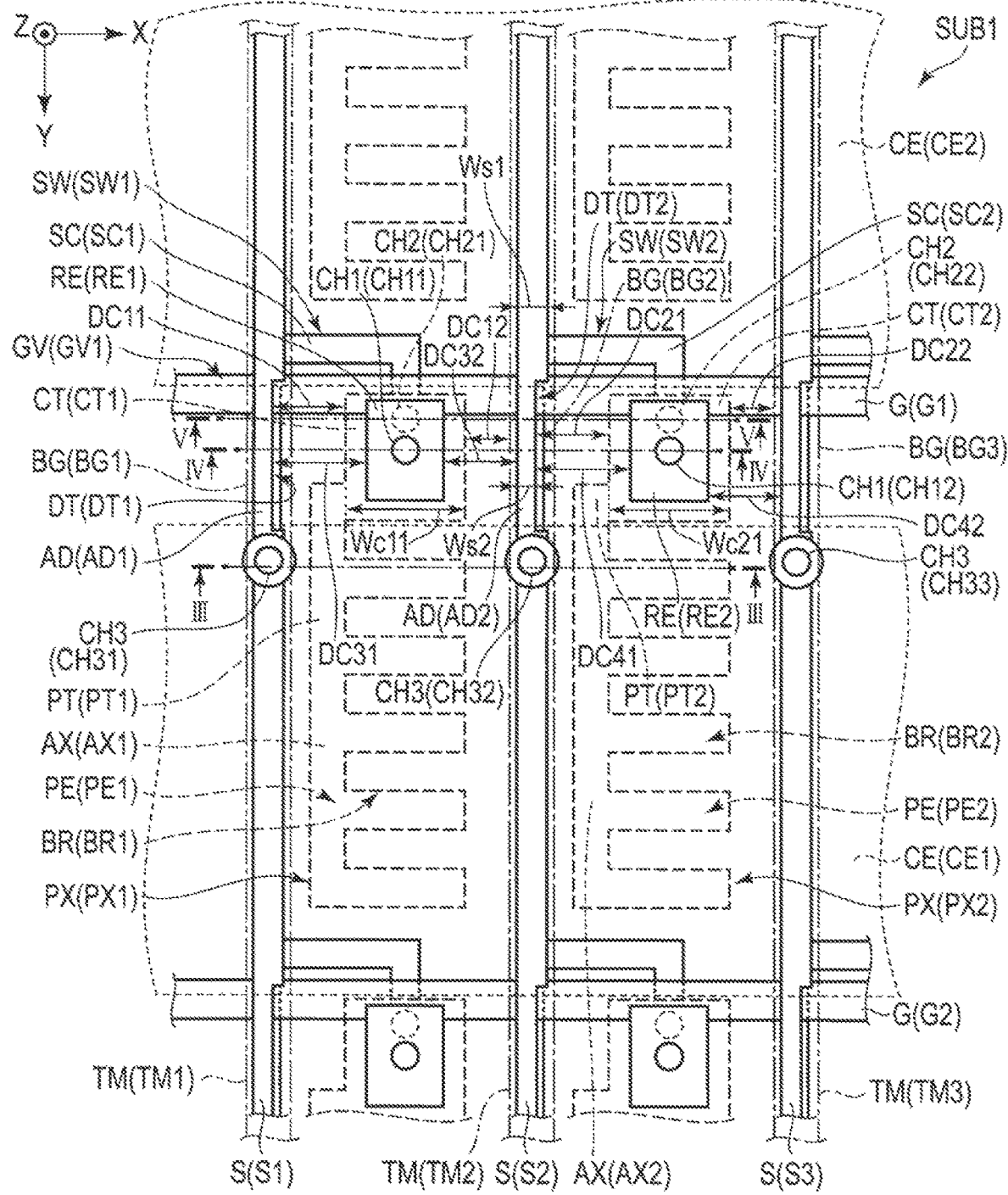
FIG. 2 is a plan view of an example of the structure of a first substrate.

FIG. 2 is a plan view of an example of the structure of the first substrate SUB1. FIG. 2 shows main parts of the first substrate SUB1.

The first substrate SUB1 includes scan lines G (G1, G2, . . . ), signal lines S (S1, S2, S3, S4, . . . ), switching elements SW (SW1, SW2, . . . ), relay electrodes RE (RE1, RE2, . . . ), metal lines TM (TM1, TM2, TM3, . . . ), common electrodes CE (CE1, CE2, . . . ), and pixel electrode PE (PE1, PE2, . . . ), for example. The scan lines G extend in the first direction X and are arranged in the second direction Y at certain intervals. In the example depicted, the scan lines G1 and G2 are arranged in the second direction Y at certain intervals. The signal lines S extend in the second direction Y and are arranged in the first direction X at certain intervals. In the example depicted, the signal lines S1, S2, and S3 are arranged in the first direction X at certain intervals. Note that, although the signal lines S extend linearly in the second direction Y in the example depicted, they may partly bend. In the example depicted, the scan lines G and the signal lines S cross each other. The areas define by the scan lines and the signal lines are subpixel areas PX (PX1, PX2, . . . ). In the present embodiment, an area defined by the scan lines G1 and G2 and the signal lines S1 and S2 will be a subpixel area PX1, and an area defined by the scan lines G2 and G3 and the signal lines S2 and S3 will be a subpixel area PX2.

The common electrode CE is disposed to cover each subpixel area PX and each signal line S. Furthermore, the common electrode CE includes openings GV (GV1, . . . ). In the example of FIG. 2, the common electrode CE includes a common electrode CE1 and a common electrode CE2 which is apart from the common electrode CE1 in the second direction Y. The common electrode CE1 covers a group of subpixel areas PX arranged in the first direction X other than the upper end part of the subpixel areas PX and covers the signal lines other than a portion corresponding to the upper end part. Note that the upper end part of the subpixel area is a part of the upper side of the direction Y in the subpixel area of FIG. 2. Furthermore, the upper end part of the subpixel area is a partial area corresponding to the relay electrode RE disposed in the subpixel area in the direction Y. The common electrode CE2 covers another group of subpixel areas PX disposed adjacent to the group of subpixel areas PX and the signal lines S as with the common electrode CE1. In other words, the common electrode CE includes a slit-like opening GV1 between the common electrodes CE1 and CE2 which are arranged in the second direction Y at an interval.

The pixel electrode PE is disposed in each subpixel PX. The pixel electrode PE includes a connector CT which is electrically connected to the relay electrode RE through a contact hole CH1, projection PT projecting from the connector CT in the first direction X, axis AX extending from the projection PT in the second direction Y, and a plurality of branches BR extending from the axis AX in the first direction X. The axis AX extends along the signal line S and the projection PT which is a proximal end part of the axis AX is disposed between the connector CT and the signal line S and is connected to the connector CT. Note that the shape of the pixel electrode PE is not limited to the example depicted, and may be arbitrarily changed to conform to the shape of the subpixel PX, for example. In the example, the axis AX and the branches BR overlap the common electrode CE, and the connector CT and the projection PT are positioned in the opening GV. The projection PT are aligned with the signal line S and the connector CT in the first direction and is disposed between the signal line S and the connector CT. Note that the connector CT and the projection PT may overlap the common electrode CE.

In the example of FIG. 2, the pixel electrode PE1 and the pixel electrode PE2 are arranged in the first direction X at an interval. The pixel electrode PE1 (first pixel electrode) is disposed in the subpixel area PX1. The pixel electrode PE1 includes a connector CT1 which is electrically connected to a relay electrode RE1 through a contact hole CH11, projection PT1 projecting from the connector CT1 in the first direction X toward the signal line S1, axis AX1 extending from the projection PT1 in the second direction Y, and a plurality of branches BR1 extending from the axis AX1 in the first direction X. The axis AX1 extends along the signal line S1, and the projection PT1 which is a proximal end part of the axis AX1 is disposed between the connector CT1 and the signal line S1 and is connected to the connector CT1. Furthermore, the connector CT1 and the projection PT1 are disposed in the opening GV1. The projection PT1 is aligned with the signal line S1 and the connector CT1 in the first direction and is disposed between the signal line S1 and the connector CT1. The connector CT1 is apart from the signal line S1 in the first direction X with a gap DC11 and is apart from the signal line S2 in the first direction X with a gap DC12. Here, the gap DC11 is greater than the gap DC12. The pixel electrode (second pixel electrode) PE2 is disposed in the subpixel area PX2. The pixel electrode PE2 includes a connector CT2 which is electrically connected to a relay electrode RE2 through a contact hole CH12, projection PT2 projecting from the connector CT2 in the first direction X toward the signal line S2, axis AX2 extending from the projection PT2 in the second direction Y, and a plurality of branches BR2 extending from the axis AX2 in the first direction X. The axis AX2 extending along the signal line S2, and the projection PT2 which is a proximal end part of the axis AX2 is disposed between the connector CT2 and the signal line S2 and is connected to the connector CT2. Furthermore, the connector CT2 and the projection PT2 are disposed in the opening GV1. The projection PT2 is aligned with the signal line S2 and the connector CT2 in the first direction X and is disposed between the signal line S2 and the connector CT2. The connector CT2 is apart from the signal line S2 in the first direction X with a gap DC21 and is part from the signal line S3 in the first direction X with a gap DC22. Here, the gap DC21 is greater than the gap DC22. For example, a width Wc11 of the connector CT1 and a width Wc21 of the connector CT2 are the same. Note that a phrase "the same" means that physical quantities of two targets are totally the same or means that physical quantities of two targets are slightly different but yet regarded as the same when capacitances between the electrodes and the display quality are all considered (the same applies to the following description). Furthermore, the gap DC11 and the gap DC12 are the same, and the gap DC12 and the gap DC22 are the same. Furthermore, the projection PT1 and the projection PT2 are the same in size. Note that, in the example of FIG. 2, the connectors CT1 and CT2 are each formed as a quadrilateral; however, another shape such as a polygon or an ellipse may be adopted. The projections PT1 and PT2 are each formed of a quadrilateral; however, another shape such as a trapezoid may be adopted, or a side opposed to the signal line S1 or S2 may be slanted to be apart from the signal line S1 or S2 while departing from the axis AX1 or AX2.

The relay electrode RE is disposed in each subpixel area PX. The relay electrode RE is electrically connected to the switching element SW through the contact hole CH2. For example, the relay electrode RE does not overlap the common electrode CE. In other words, the relay electrode RE is disposed in the opening GV. Furthermore, the relay electrode RE overlaps the connector CT. In a plan view, the size of the relay electrode RE is less than the size of the connector CT. The relay electrode RE is formed of a material used for the signal line S and the like. The relay electrode RE is, in the opening GV, apart from two signal lines S adjacent to each other in the first direction X with different gaps. Note that the relay electrode RE may overlap the common electrode CE. The size of the relay electrode RE may be greater than the size of the connector CT. Furthermore, the relay electrode RE may be, in the opening GV, apart from the two signal lines S adjacent to each other in the first direction X with the same gap. The relay electrode RE1 is disposed in the subpixel area PX1 and is electrically connected to the switching element SW1 through a contact hole CH21. The relay electrode RE1 is, in the opening GV1, apart from the signal line S1 in the first direction X with a gap DC31 and is apart from the signal line S2 in the first direction X with a gap DC32. The gap DC31 is greater than the gap DC32. The relay electrode RE2 is disposed in the subpixel area PX2 and is electrically connected to the switching element SW2 through a contact hole CH22. The relay electrode RE2 is, in the opening GV2, apart from the signal line S2 in the first direction X with a gap DC41 and is apart from the signal line S3 in the first direction X with a gap DC42. The width of the relay electrode RE1 and the width of the relay electrode RE2 are the same. In that case, the gap DC31 and the gap DC41 are the same. Furthermore, the gap DC32 and the gap DC42 are the same. Note that, in the example of FIG. 2, the relay electrodes RE1 and RE2 are each formed of a quadrilateral; however, another shape such as a polygon or an ellipse may be adopted.

The switching element SW is electrically connected to the signal line S via contact hole CH3 (CH31, CH32, . . . ). The switching element SW includes semiconductor layer SC (SC1, SC2, . . . ). In the example of FIG. 2, the switching element SW is a double gate type switching element which crosses the scan line G twice. The switching element SW1 is disposed in the subpixel area PX1, and is electrically connected to the signal line S1 via a contact hole CH31. The switching element SW1 includes a semiconductor layer SC1. The switching element SW1 crosses the scan line G1 twice. Note that the switching element SW may be a single gate type one which crosses the scan line G once.

The signal line S is formed, in the first direction, to be apart from two adjacent connectors CT and relay electrodes RE with different gaps. The signal line S includes, in the part overlapping the opening GV, a concave DT in the side closer to the projection PT that is connected the signal line S with the switching element SW. In a plan view, the concave DT is, in the first direction X, opposed to the projection PT and recessed in a direction away from the projection PT. In the signal line S, a part corresponding to the opening GV including the concave DT will be referred to as variant portion AD (AD1, AD2, . . . ). In the opening GV, the capacitance balance between a left capacitance with the elements in the subpixel area PX1 and the variant portion AD, and a right capacitance with the elements in the subpixel area PX2 and the variant portion AD is adjusted. A width Ws2 of the variant portion AD (AD1, AD2, . . . ) of the signal line S with the concave DT is less than a width Ws1 of other parts of the signal line S, for example, the signal line S overlapping the common electrode CE, for example. The width Ws2 is less than the width Ws1 by a few tenths of micrometers (μm) or the like. Note that the variant portion AD may overlap the common electrode CE. In other words, the concave DT may overlap the common electrode CE. The variant portion AD2 includes a concave DT2 in the side closer to the projection PT2. In a plan view, the concave DT2 is, in the first direction X, opposed to the projection PT2 and recessed in a direction away from the projection PT2. The variant portion AD2 is apart from the connector CT1 in the first direction X with the gap DC12 and is apart from the connector CT2 in the first direction X with the gap DC21. Furthermore, the variant portion AD2 is apart from the relay electrode RE1 in the first direction X with the gap DC32 and is apart from the relay electrode RE2 in the first direction X with the gap DC41. The gap DC21 is greater than the gap DC12 by the recessing concave DT2. The gap DC41 is greater than the gap DC32 by the recessing concave DT2. For example, the signal line S2 produces the same parasitic capacitance (or, capacitance) with the connectors CT1 and with the connectors CT2. Note that the signal line S2 may produce a slightly different capacitances between the connectors CT1 and CT2.

The metal lines TM extend in the second direction and are arranged in the first direction X at intervals. The metal line TM overlaps the signal line S. The metal line TM is electrically connected to the common electrode CE. A part (hereinafter referred to as bridge line) BG of the metal line TM intersecting the opening G is connected to the common electrode CE1 and CE2 over the opening GV. Furthermore, the bridge line BG overlaps the variant portion AD but does not overlap the connector CT or the relay electrode RE. The width of the metal line TM may be the same as the width Ws1 of the signal line S. The metal line TM is formed of a metal material such as molybdenum (Mo) or an alloy containing molybdenum as the main component. In the example of FIG. 2, the metal lines TM1, TM2, and TM3 are arranged in the first direction X at certain intervals. The metal lines TM1, TM2, and TM3 overlap the signal lines S1, S2, and S3, respectively. The metal lines TM1, TM2, and TM3 are electrically connected to the common electrodes CE1 and CE2. For example, a bridge line BG2 of the metal line TM2 is connected to the common electrodes CE1 and CE2 over the opening GV1. Furthermore, the bridge line BG2 overlaps the variant portion AD2 but does not overlap the connectors CT1 and CT2 or the relay electrodes RE1 and RE2.

FIG. 3 is a cross-sectional view of an example of the structure of the display device DSP, taken along line III-III of FIG. 2.

The first substrate SUB1 includes, for example, the switching element SW, signal line S, metal line TM, common electrode CE, first insulating substrate 10, insulating layers 11, 12, 13, 14, and 15, and first alignment film AL1. Note that the first substrate SUB1 is not limited to the depicted example, and may include different insulating layers and various layers.

The first insulating substrate 10 is formed of, for example, a non-alkaline glass or a transparent resin. The insulating layer 11 is positioned above the first insulating substrate 10. The switching element SW is positioned above the insulating layer 11. The insulating layer 12 covers the insulating layer 11 and the switching element SW. The insulating layer 13 is positioned above the insulating layer 12. The signal line S is positioned above the insulating layer 13. The signal line S is connected to the switching element SW through the contact hole CH3 passing through the insulating layers 12 and 13. In the example depicted, the signal line S1 is connected to the switching element SW1 through the contact hole CH31 passing through the insulating layers 12 and 13. The signal line S2 is connected to the switching element SW2 through the contact hole CH32 passing through the insulating layers 12 and 13. The insulating layer 14 covers the signal line S and the insulating layer 13. The metal line TM is positioned above the insulating layer 14 and is opposed to the signal line S. The common electrode CE covers the metal line TM and the insulating layer 14. The common electrode CE contacts the metal line TM. Furthermore, the common electrode CE is positioned above the switching element SW in each subpixel area PX. The insulating layer 15 is positioned above the common electrode CE. The pixel electrode PE is positioned above the insulating layer 15. Furthermore, the pixel electrode PE is positioned above the common electrode CE in each subpixel area PX. The insulating layers 11 to 13 and 15 are, for example, inorganic insulating layers, and the insulating layer 14 is, for example, an organic insulating layer. The first alignment film AL1 covers the pixel electrode PE and the insulating layer 15.

The second substrate SUB2 includes, for example, a second insulating substrate 20, color filter CF, overcoat layer OC, and second alignment film AL2. Note that the second substrate SUB2 is not limited to the depicted example, and may include other insulating layers or various layers.

The second insulating substrate 20 is formed of, for example, a non-alkaline glass or a transparent resin. The color filter CF is positioned below the second insulating substrate 20. The overcoat layer OC is positioned below the color filter CF. The color filter CF includes, for example, a red color filter, green, color filter, and blue color filter. Furthermore, the color filter CF may include a color filter of different color such as white. The second alignment film AL2 is positioned below the overcoat layer OC.

A first optical element OD1 including a first polarizer PL1 is disposed between the first insulating substrate 10 and the lighting device BL. A second optical element OD2 including a second polarizer PL2 is positioned above the second insulating substrate 20. The first optical element OD1 and the second optical element OD2 may each include a retardation plate if necessary.

Figure 4:
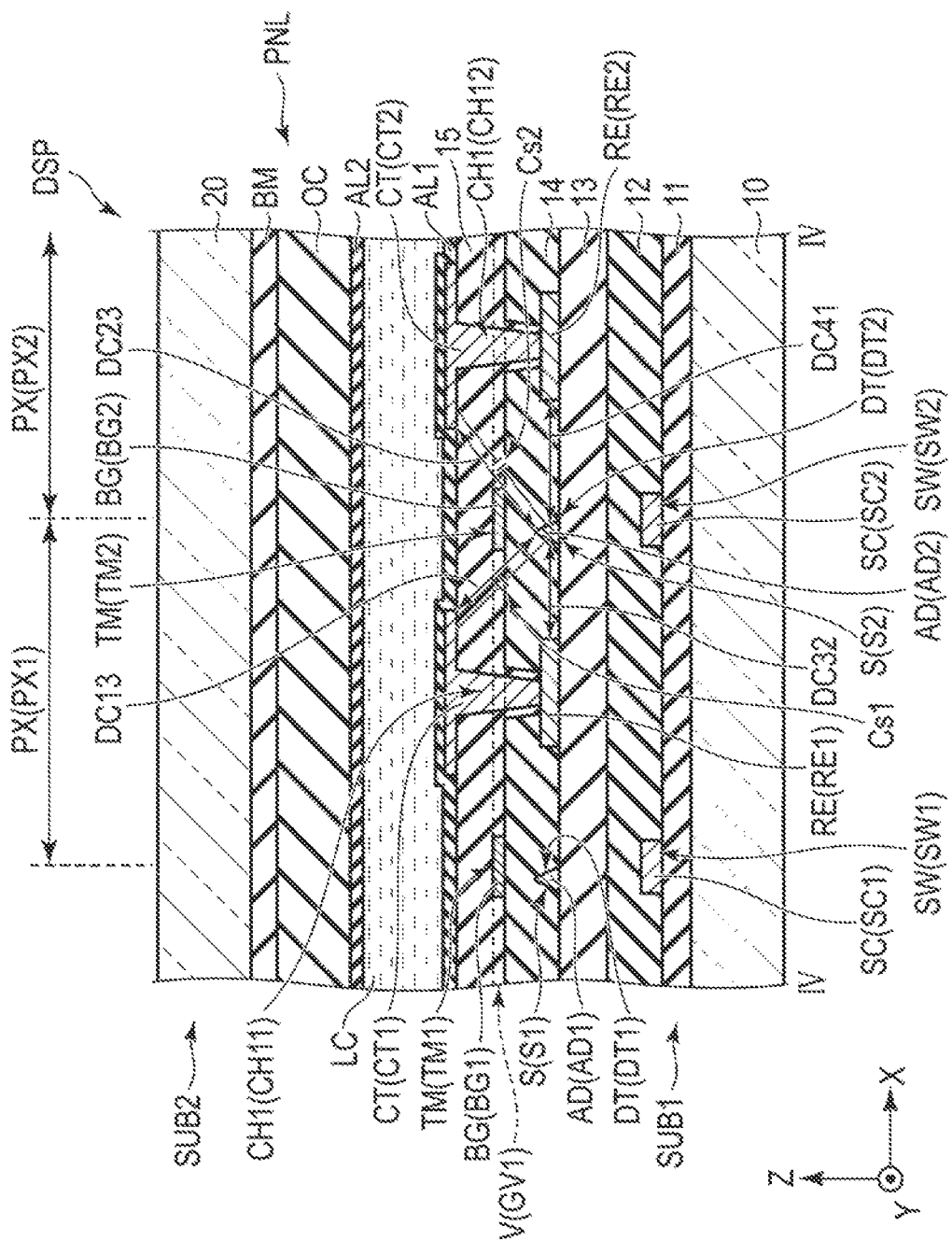
FIG. 4 is a cross-sectional view of an example of the structure of the display device, taken along line IV-IV of FIG. 2.

FIG. 4 is a cross-sectional view of an example of the structure of the display device DSP, taken along line IV-IV of FIG. 2. Here, only the elements required for the explanation are shown.

The first substrate SUB1 further includes a relay electrode RE and the like. The relay electrode RE is positioned between the insulating layers 13 and 14. The relay electrode RE is positioned in the same layer with the variant portion AD (signal line S or concave DT) in each subpixel area PX. The switching element SW (semiconductor layer SC) is opposed to the variant portion AD. The bridge line BG is positioned above the variant portion AD and is opposed to the variant portion AD. In other words, the bridge line BG is positioned above the concave DT and is opposed to the concave DT. Furthermore, the connectors CT are positioned above the insulating layer 15 and are arranged in the first direction X at intervals. The connector CT is connected to the relay electrode RE through the contact hole CH1 passing through the insulating layers 14 and 15. In other words, the connector CT is connected to the relay electrode RE through the opening GV positioned between the insulating layers 14 and 15. In the example of FIG. 4, the relay electrodes RE1 and RE2 are positioned between the insulating layers 13 and 14 and are apart from each other in the first direction X. The relay electrode RE1 is positioned in the subpixel area PX1 and is in the same layer with the adjustors AD1 and AD2. The relay electrode RE2 is positioned in the subpixel area PX2 and is in the same layer with the adjustors AD1 and AD2. The switching element SW1 is opposed to the variant portion AD1 and the switching element SW2 is opposed to the variant portion AD2. The bridge line BG1 is positioned above the variant portion AD1 and is opposed to the variant portion AD1. The bridge line BG2 is positioned above the variant portion AD2 and is opposed to the variant portion AD2. The connectors CT1 and CT2 are positioned above the insulating layer 15 and are apart from each other in the first direction X. The connector CT1 is connected to the relay electrode RE1 through the contact hole CH11 passing through the insulating layers 14 and 15. The connector CT2 is connected to the relay electrode RE2 through the contact hole CH12 passing through the insulating layers 14 and 15. For example, a gap DC23 between the variant portion AD2 and the connector CT2 is greater than a gap DC13 between the variant portion AD2 and the connector CT1. Furthermore, a capacitance Cs1 between the variant portion AD2 and the connector CT1 and a capacitance Cs2 between the variant portion AD2 and the connector CT2 are substantially the same. The width of the bridge line BG2 is, for example, greater than the width of the variant portion AD2. In the example depicted, the bridge line BG2 extends, in the first direction X, in the connector CT2 side with respect to the variant portion AD2. In that case, the bridge line BG2 can suppress the capacitance Cs2. Note that the bridge line BG2 may extend, in the first direction X, in the connector CT1 side with respect to the variant portion AD2, or may extend in the connector CT1 side and the connector CT2 side.

Figure 5:
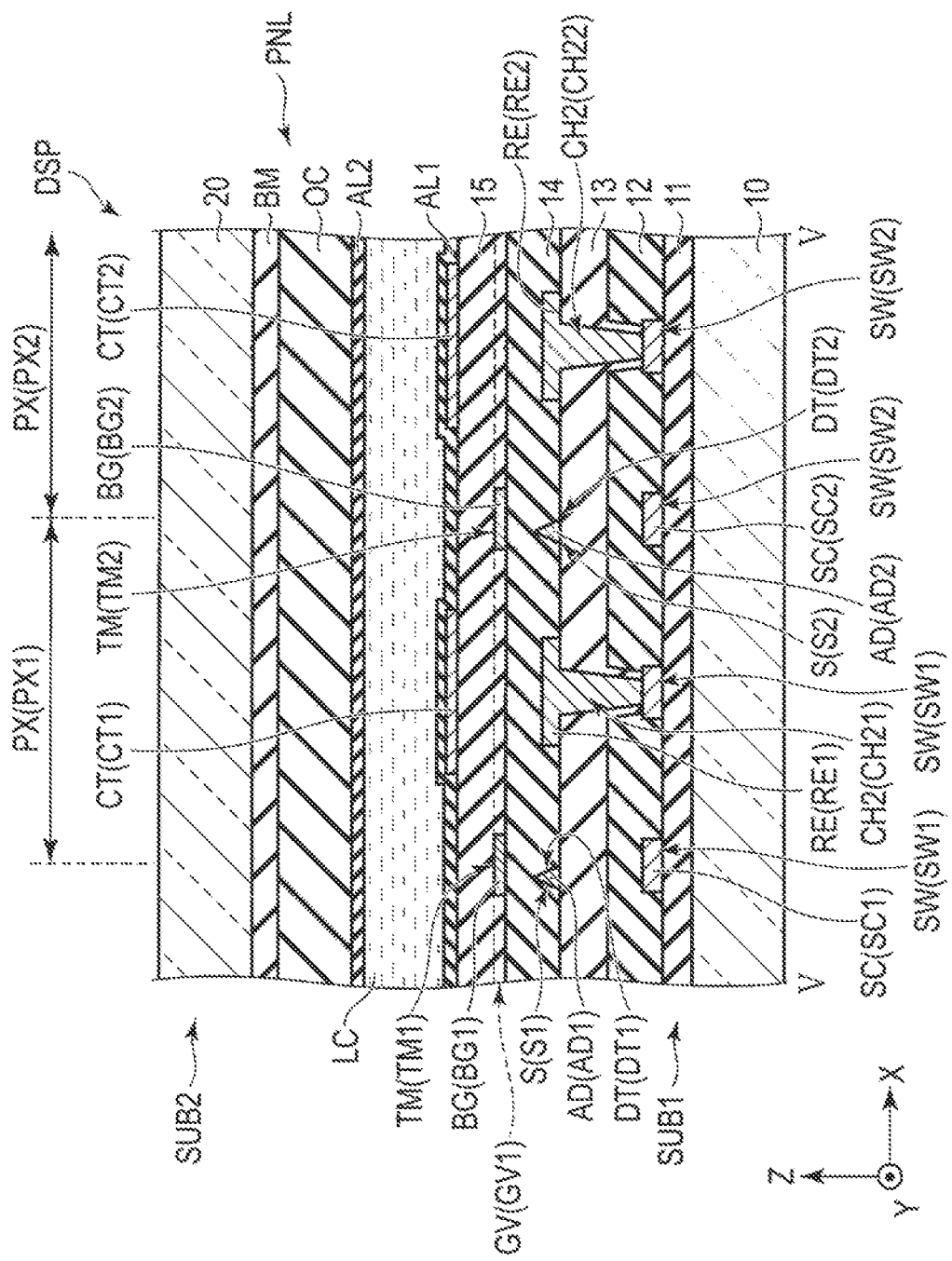
FIG. 5 is a cross-sectional view of an example of the structure of the display device, taken along line V-V of FIG. 2.

FIG. 5 is a cross-sectional view of an example of the structure of the display device DSP, taken along line V-V of FIG. 2. Here, only the elements required for the explanation are shown.

The relay electrode RE is, in each subpixel area PX, connected to the switching element SW through the contact hole CH2 passing through the insulating layers 12 and 13. That is, in FIGS. 4 and 5, the connector CT is, in each subpixel area PX, connected to the switching element SW through the relay electrode RE. In the example of FIG. 5, the relay electrode RE1 is, in the subpixel area PX1, connected to the switching element SW1 through the contact hole CH21 passing through the insulating layers 12 and 13. The relay electrode RE2 is, in the subpixel area PX2, connected to the switching element SW2 through the contact hole CH22 passing through the insulating layers 12 and 13. In FIGS. 4 and 5, the connector CT1 is connected to the switching element SW1 through the relay electrode RE1 in the subpixel area PX1. The connector CT2 is connected to the switching element SW2 through the relay electrode RE2 in the subpixel area PX2.

In the present embodiment, the display device DSP includes the pixel electrode PE with the connector CT and the projection PT and the variant portion AD including the concave DT in the side closer to the projection PT. The connector CT, projection PT, and variant portion AD overlap the opening GV. The concave DT is, in the first direction X, recessed in a direction away from the projection PT between two connectors CT adjacent to each other. Therefore, in the display device DSP of this embodiment, even if a higher definition is achieved, a capacitance between a signal line S and a connector CT adjacent to the right side of the signal line S and another capacitance between the signal line S and another connector CT adjacent to the left side of the signal line S are balanced. Specifically, when the display signal is supplied to a signal line S, capacitances are produced between the signal line S and pixel electrodes PE positioned in both sides of the signal line S in an opening GV. At that time, since a projection PT2 of a pixel electrode PE2 is disposed close to a signal line S2 as shown in FIG. 2, a capacitance between a signal line S2 and a connector CT1 and a capacitance between a signal line S2 and a connector CT2 may become unbalanced around the opening GV. In consideration of this point, as shown in the embodiment, gaps between the connectors CT of the pixel electrode PE and the signal lines S, and between the relay electrodes RE and the signal lines S are adjusted in the opening GV, and thus, capacitances in the both sides of the signal line S becomes substantially equal.

In a conventional pixel structure, an opening formed in a common electrode is provided only with the proximity of a connector (proximity of a lower part of a connector) of a pixel electrode, and the common electrode is interposed between a signal line and the pixel electrode. The common electrode itself suppresses a capacitance between the pixel electrode and the signal line. In a display panel of higher definition in which pixel pitches are significantly reduced as in the present embodiment, since the pixel pitches are too small, the opening provided only with the proximity of the connector is difficult to be formed, and consequently the common electrode cannot be interposed between the pixel electrode and the signal line in the area. As a result, the capacitances between the pixel electrodes and the signal line cannot be suppressed. Thus, in the present embodiment, while the capacitance produced is accepted, the capacitances in the right and left sides is balanced to minimize an influence of the capacitances to the display quality.

Furthermore, in the present embodiment, gaps between a signal line S and a pixel electrode PE or a relay electrode RE connected to the signal line S (for example, DC21, or DC41) is greater than gaps between the signal line S and a pixel electrode PE which is not connected to the signal line S (for example, DC12, or DC32) in the opening GV. Thus, the pixel electrodes PE which receive the pixel signal from the signal line S is set to be further apart from the signal line S, and the size of the capacitance to be balanced can be reduced. As a result, in the present embodiment, the display device of higher definition is achieved without deteriorating the display quality.

In the present embodiment, gaps between the connector CT of the pixel electrode PE and the signal line S, and between the relay electrode RE and the signal line S in the opening GV are adjusted using the variant portion AD, and the balance of the capacitances which are produced between the signal line S and the pixel electrodes PE in the both sides is kept. In addition, other structures created by adjusting the position of the pixel electrodes PE in the subpixel area PX, by changing the shape of the signal line S, or the like are adoptable. Hereinafter, variations of the present embodiment will be explained.

Variations of the present embodiment will be explained with reference to FIGS. 6 to 12. In the variations of the present embodiment, parts which are the same with those of the above-described embodiment will be referred to by the same reference numbers and the detailed description thereof will be omitted. Only the parts different from those of the above-described embodiment will be explained. Note that, the variations can achieve the same advantages achieved in the above-described embodiment.

(Variation 1)

Figure 6:
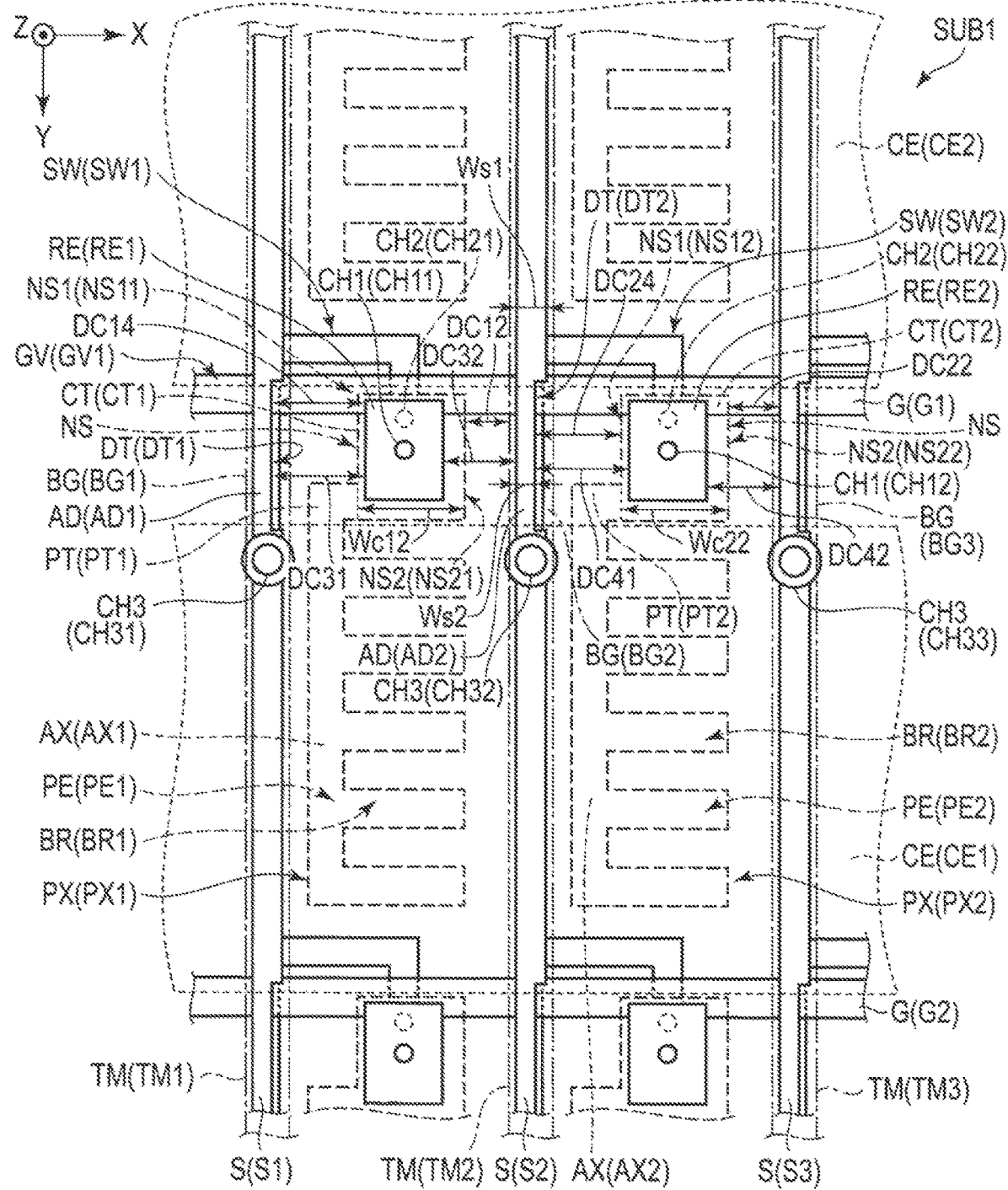
FIG. 6 is a plan view of an example of the structure of a part of a display device of variation 1 of the embodiment.

In variation 1 of FIG. 6, pixel electrodes PE are different as compared to the structure of FIG. 2.

The connector CT of the pixel electrode PE includes a non-overlapping part NS which does not overlap the relay electrode, and a width of a non-overlapping part NS1 which is in a position closer to the projection PT connected thereto is less than a width of a non-overlapping part NS2 which is an opposite side of the position closer to the projection PT connected to the non-overlapping part NS1 (hereinafter referred to as a side far from the projection PT). The non-overlapping part NS1 is formed, in the first direction X, in a position opposite to the signal line S positioned in the projection PT side. For example, by decreasing the contact hole CH1 by a few tenths of micrometers (μm) or the like, a margin to form the non-overlapping part NS1 is formed in the connector CT. The non-overlapping part NS2 is formed in the position to be the signal line S side in the projection PT side in the first direction X. In the example of FIG. 6, the connector CT1 includes, in the first direction X, a non-overlapping part NS11 which is in a position closer to a projection PT1 and a non-overlapping part NS21 which is in a far side from the projection PT1. The width of the non-overlapping part NS11 is less than the width of the non-overlapping part NS21. In other words, the non-overlapping part NS11 is recessed in the opposite side of the signal line S1 in the first direction X. The connector CT1 is apart from the signal line S1 in the first direction X with a gap DC14, and is apart from the signal line S2 in the first direction X with a gap DC12. Here, the gap DC14 is greater than the gap DC11 and is greater than the gap DC12. A width Wc12 of the connector CT1 is less than the width Wc11. The connector CT2 includes a non-overlapping part NS12 which is a position closer to the projection PT2 in the first direction X and a non-overlapping part NS22 which is in a far side from the projection PT2. The width of the non-overlapping part NS12 is less than the width of the non-overlapping part NS22. In other words, the non-overlapping part NS21 is recessed in the opposite side of the signal line S2 in the first direction X. The connector CT2 is apart from the signal line S2 in the first direction X with a gap DC24, and is apart from the signal line S3 in the first direction X with a gap DC22. Here, the gap DC24 is greater than the gap DC11 and is greater than the gap DC22. A width Wc22 of the connector CT2 is less than the width Wc21. The gaps DC14 and DC24 are, for example, the same. Furthermore, the width Wc12 and the width Wc22 are the same. The advantages achieved in the above-described embodiment can be achieved in variation 1 as well.

(Variation 2)

Figure 7:
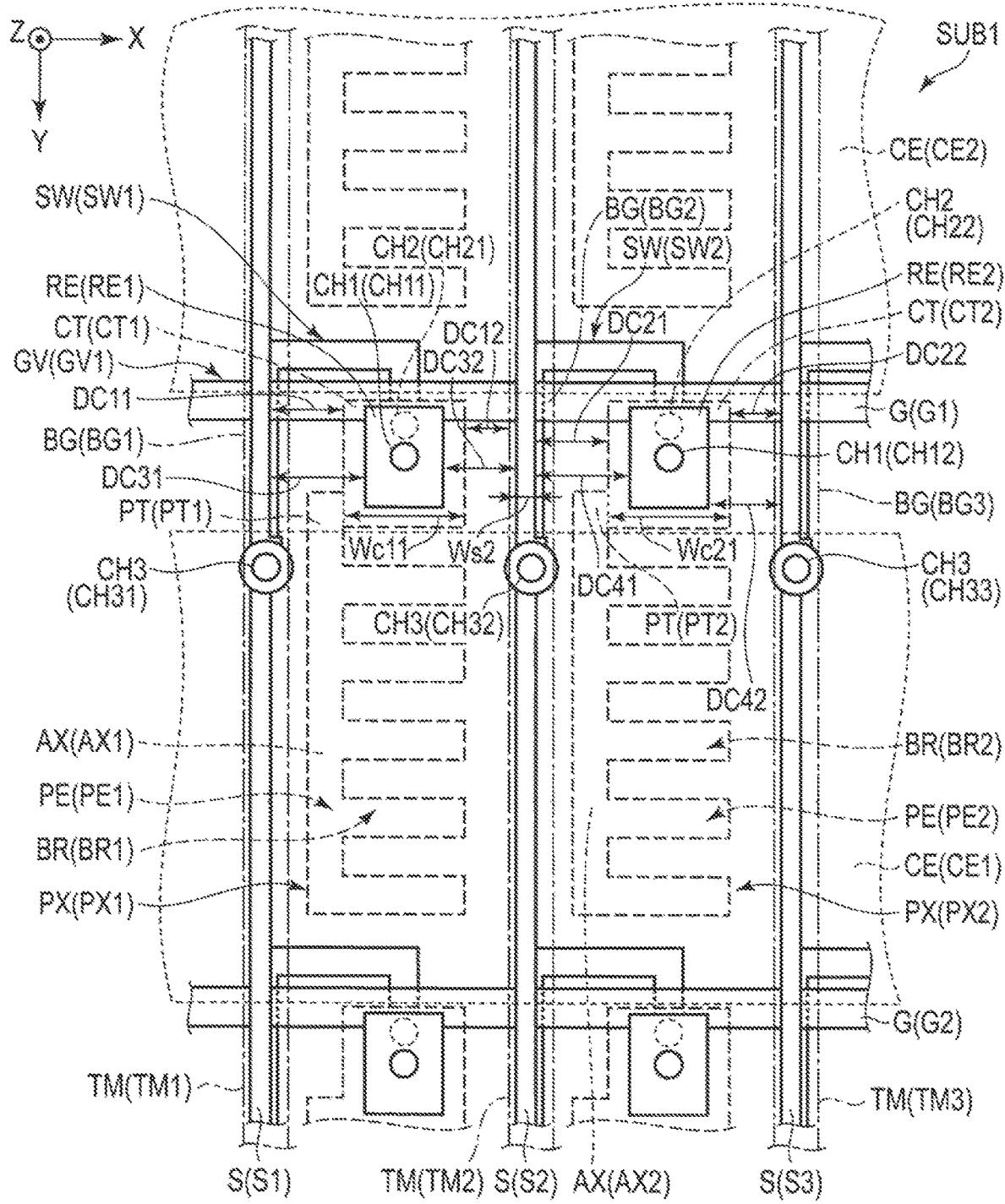
FIG. 7 is a plan view of an example of the structure of a part of a display device of variation 2 of the embodiment.

In variation 2 of FIG. 7, signal lines S are different as compared to the structure of FIG. 2.

In the example of FIG. 7, a width of the signal line S is constant and adjusted so that a capacitance between a signal line S and a connector CT adjacent to the right side of the signal line S and another capacitance between the signal line S and another connector CT adjacent to the left side of the signal line S are equal. For example, the signal line S is formed with a width Ws2 in its entirety. The signal line S2 is apart from the connector CT1 in the first direction X with a gap DC12, and is apart from the connector CT2 in the first direction X with a gap DC21. The advantages achieved in the above-described embodiment can be achieved in variation 2 as well.

(Variation 3)

Figure 8:
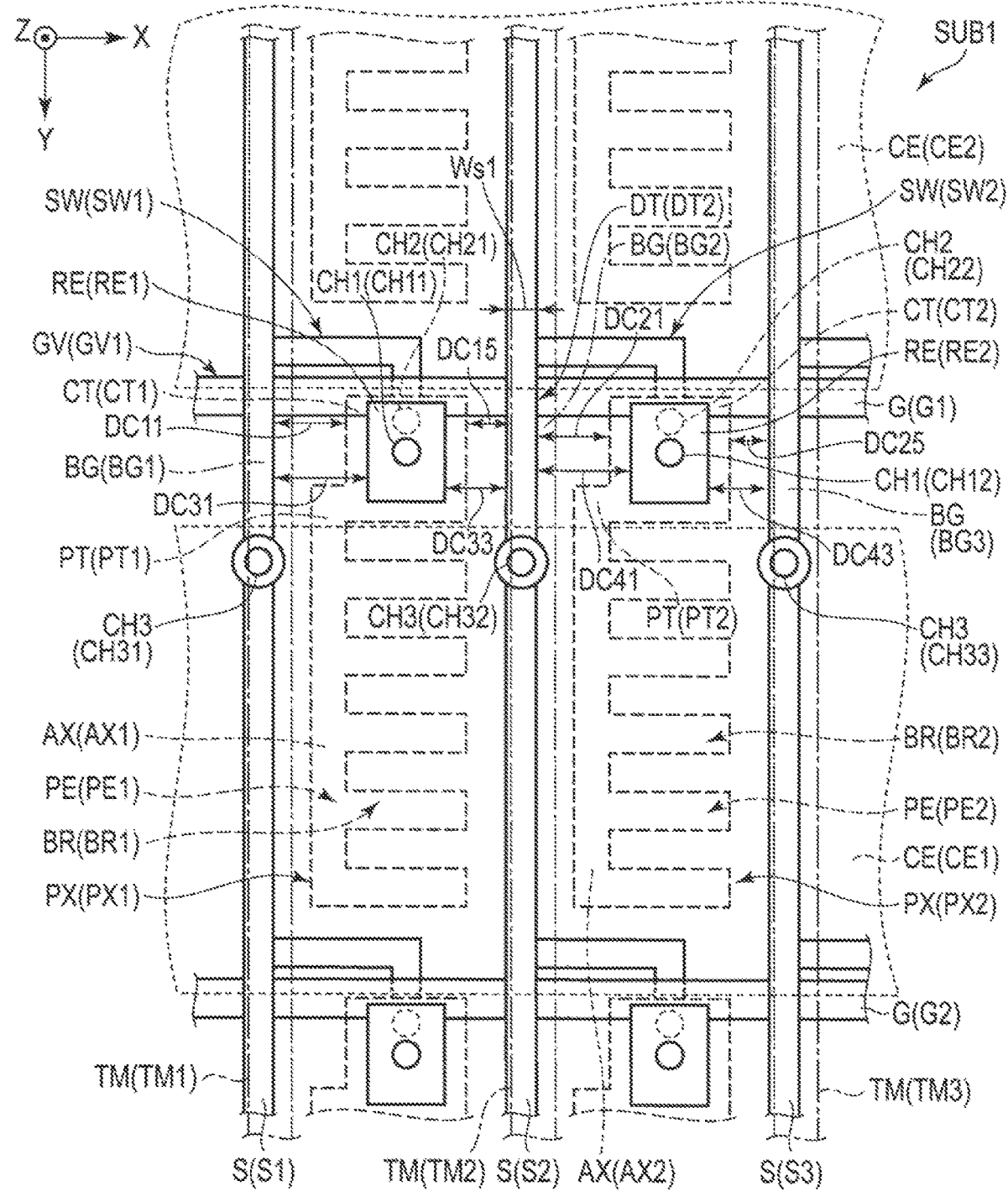
FIG. 8 is a plan view of an example of the structure of a part of a display device of variation 3 of the embodiment.

In variation 3 of FIG. 8, signal lines S are different as compared to the structure of FIG. 2.

The position of signal lines S is adjusted in the first direction X so that a capacitance between a signal line S and a connector CT adjacent to the right side of the signal line S and another capacitance between the signal line S and another connector CT adjacent to the left side of the signal line S are equal. For example, the signal line S2 is formed with a width Ws1 in its entirety. The signal line S2 is apart from the connector CT1 in the first direction X with a gap DC15 and is apart from the connector CT2 in the first direction X with a gap DC21. Furthermore, the signal line S2 is apart from the relay electrode RE1 in the first direction X with a gap DC33 and is apart from the relay electrode RE2 in the first direction X with a gap DC41. Here, the gap DC15 is less than the gap DC12 and is less than the gap DC11. The gap DC25 is less than the gap DC22 and is less than the gap DC21. The gap DC33 is less than the gap DC32 and is less than the gap DC31. The gap DC43 is less than the gap DC42 and is less than the gap DC41. The gaps DC15 and DC25 are the same, and the gaps DC33 and DC43 are the same. In variation 3, the advantages achieved in the above-described embodiment can be achieved as well.

Note that, in this variation, a signal line overlaps the metal line TM in a plan view; however, a slight part of the signal line does not overlap the metal line. A structure in which the entire signal line overlaps the metal line can be adopted.

(Variation 4)

Figure 9:
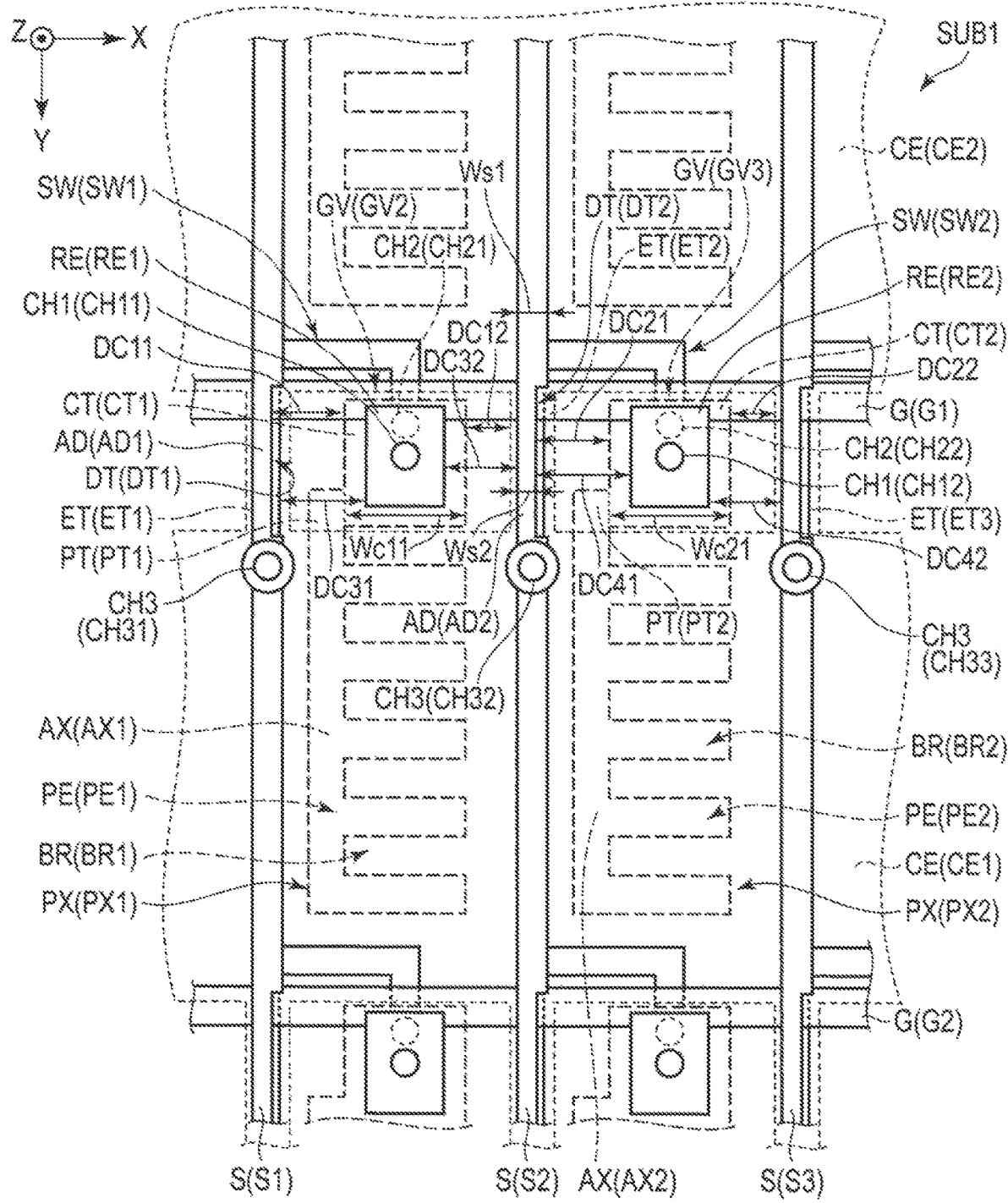
FIG. 9 is a plan view of an example of the structure of a part of a display device of variation 4 of the embodiment.

In variation 4 of FIG. 9, the common electrode CE is different as compared to the structure of FIG. 2.

The common electrode CE extends in the second direction and includes a plurality of bridge parts ET (ET1, ET2, ET3, . . . ) and a plurality of openings GV (GV2, GV3, . . . ) arranged in the first direction X at intervals. In the common electrode CE, an opening GV is formed between two bridge parts ET adjacent in the first direction X. The bridge part ET overlaps the signal line S. The bridge part ET does not overlap the connector CT or the relay electrode RE. The width of the bridge part ET may be, for example, the same as the width Ws1 of the signal line S. In the example of FIG. 9, the bridge part ET1, ET2, and ET3 are arranged in the first direction X at certain intervals. The bridge parts ET1, ET2, and ET3 overlap the signal lines S1, S2, and S3, respectively. For example, the bridge part ET2 does not overlap the connectors CT1 and CT2 and the relay electrodes RE1 and RE2. The opening GV2 is defined by the common electrodes CE1 and CE2 and the bridge parts ET1 and ET2. The opening GV3 is defined by the common electrodes CE1 and CE2 and the bridge parts ET2 and ET3. The advantages achieved in the above-described embodiment can be achieved in variation 4 as well.

(Variation 5)

Figure 10:
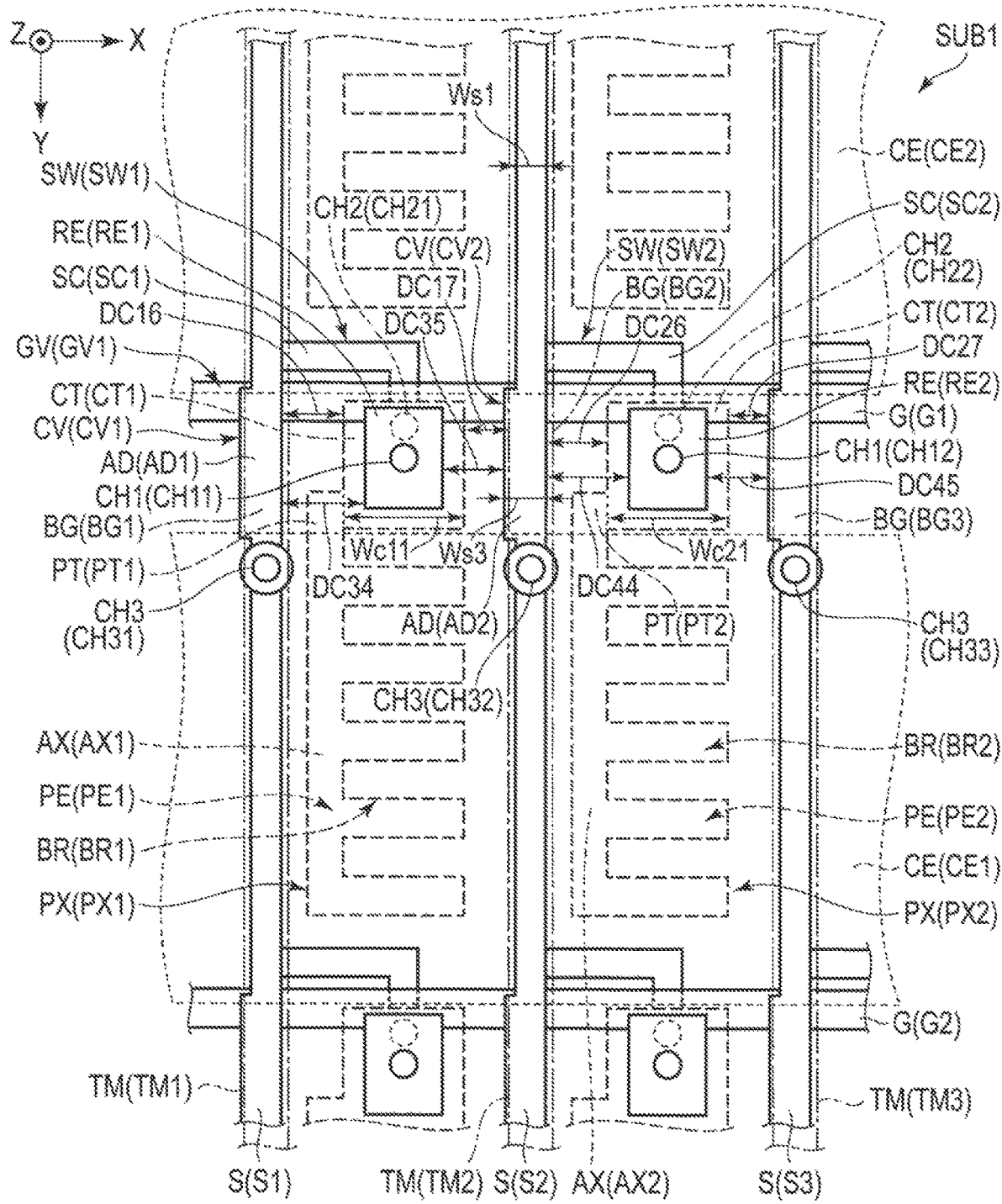
FIG. 10 is a plan view of an example of the structure of a part of a display device of variation 5 of the embodiment.

In variation 5 of FIG. 10, signal lines S are different as compared to the structure of FIG. 2.

In the example of FIG. 10, the connector CT1 is apart from the signal line S1 in the first direction X with a gap DC16 and is apart from the signal line S2 in the first direction X with a gap DC17. Note that the gap DC16 is greater than the gap DC17. The connector CT2 is apart from the signal line S2 in the first direction X with a gap DC26, and is apart from the signal line S3 in the first direction X with a gap DC27. Here, the gap DC26 is greater than the gap DC27. For example, the gap DC16 and the gap DC26 are the same, and the gap DC17 and the gap DC27 are the same.

In the example of FIG. 10, the relay electrode RE1 is, in the opening GV1, apart from the signal line S1 in the first direction X with a gap DC34 and is apart from the signal line S2 in the first direction X with a gap DC35. The gap DC34 is greater than the gap DC35. The relay electrode RE2 is, in the opening GV1, apart from the signal line S2 in the first direction X with a gap DC44, and is apart from the signal line S3 in the first direction X with a gap DC45. The width of the relay electrode RE1 and the width of the relay electrode RE2 are the same. In that case, the gap DC34 and the gap DC44 are the same. Furthermore, the gap DC35 and the gap DC45 are the same.

The signal line S includes, in the part overlapping the opening GV, a convex CV in the far side from the projection PT that is connected to the signal line via the switching element. In other words, the variant portion AD includes the convex CV in the far side from the protrusion PT. The convex CV projects in a direction away from the projection PT in the first direction X. A width Ws3 of the variant portion AD is greater than a width of the surrounding signal lines S, for example, a width Ws1. The width Ws3 is greater than the width Ws1 by a few tenths of micrometers (μm) or the like. Note that the convex CV may overlap the common electrode. Furthermore, the width Ws3 may be greater than the width of the metal line TM. The variant portion AD2 includes a convex CV2 in the far side from the projection PT2. The convex CV2 projects in the opposite side of the projection PT2 in the first direction X. The variant portion AD2 is apart from the connector CT1 in the first direction X with a gap DC17, and is apart from the connector CT2 in the first direction X with a gap DC26. Furthermore, the variant portion AD2 is apart from the relay electrode RE1 in the first direction X with a gap DC35 and is apart from the relay electrode RE2 in the first direction X with a gap DC44. The gap DC26 is greater than the gap DC17 by the projecting convex CV2. The gap DC44 is greater than the gap DC35 by the projecting convex CV2. The advantages achieved in the above-described embodiment can be achieved in variation 5 as well.

(Variation 6)

Figure 11:
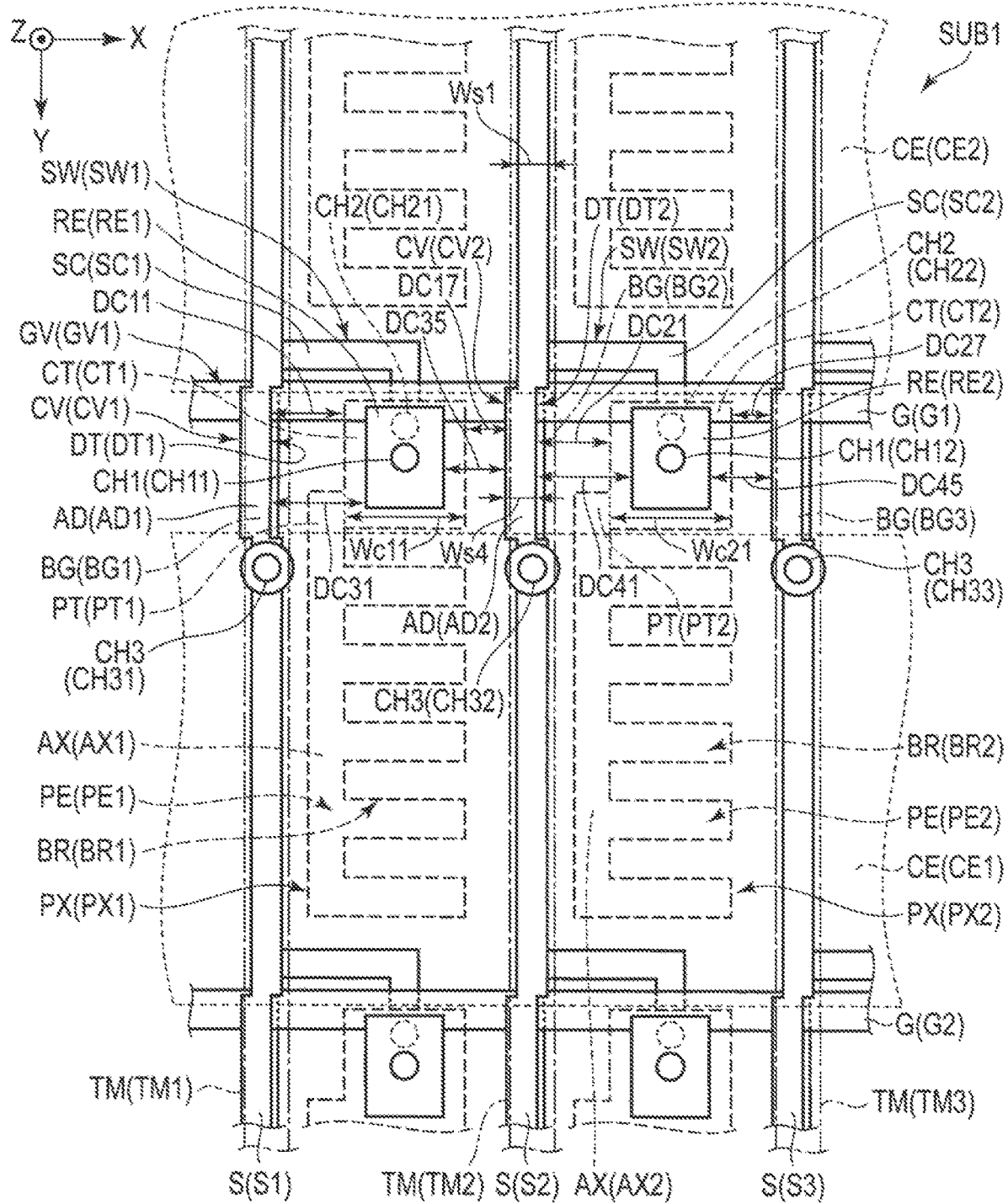
FIG. 11 is a plan view of an example of the structure of a part of a display device of variation 6 of the embodiment.

In variation 6 of FIG. 11, signal lines S are different as compared to the structure of FIG. 10.

In the example of FIG. 11, the connector CT1 is apart from the signal line S1 in the first direction X with a gap DC11 and is apart from the signal line S2 in the first direction X with a gap DC17. Here, the gap DC11 is greater than the gap DC17. The connector CT2 is apart from the signal line S2 in the first direction X with a gap DC21 and is apart from the signal line S3 in the first direction X with a gap DC27. Here, the gap DC21 is greater than the gap DC27.

In the example of FIG. 11, the relay electrode RE1 is, in the opening GV1, apart from the signal line S1 in the first direction X with a gap DC31 and is apart from the signal line S2 in the first direction X with a gap DC35. The gap DC31 is greater than the gap DC35. The relay electrode RE2 is, in the opening GV1, apart from the signal line S2 in the first direction X with a gap DC41, and is apart from the signal line S3 in the first direction X with a gap DC45.

The signal line S includes, in the part overlapping the opening GV, a concave DT and a convex CV projecting in a direction away from the concave DT. In other words, the variant portion AD includes the concave DT and the convex CV projecting in a direction away from the concave DT. A width Ws4 of the variant portion AD and a width Ws1 are the same. Note that the width Ws4 may be greater or less than the width Ws1. Furthermore, the width Ws4 may be the same as the width of the metal line TM, or may be greater or less than the width of the metal line TM. The variant portion AD2 includes a concave DT2 and a convex CV2. The variant portion AD2 is apart from the connector CT1 in the first direction X with a gap DC17 and is apart from the connector CT2 in the first direction X with a gap DC21. In addition, The variant portion AD2 is apart from the relay electrode RE1 in the first direction X with a gap DC35 and is apart from the relay electrode RE2 in the first direction X with a gap DC41. The gap DC21 is greater than the gap DC17 by the recessing concave DT2 and the projecting convex CV2. The gap DC41 is greater than the gap DC35 by the recessing concave DT2 and the projecting convex CV2. The advantages achieved in the above-described embodiment can be achieved in variation 6 as well.

(Variation 7)

Figure 12:
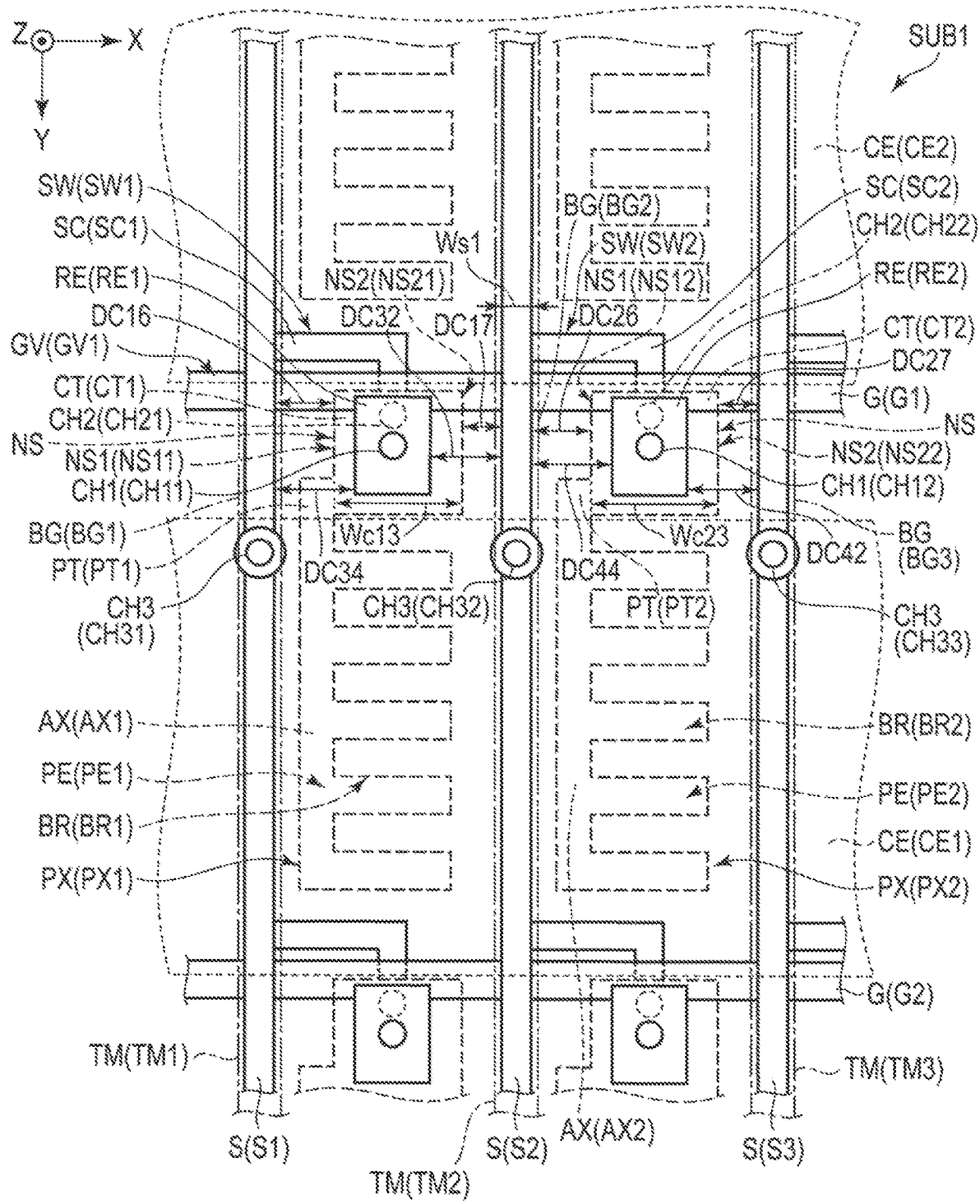
FIG. 12 is a plan view of an example of the structure of a part of a display device of variation 7 of the embodiment.

In variation 7 of FIG. 12, pixel electrodes PE are different as compared to the structure of FIG. 2.

In the connector CT of the pixel electrode PE, a width of a non-overlapping part NS2 which is in a far side from the projection PT connected thereto is greater than a width of a non-overlapping part NS1 which is in a position closer to the projection PT. In the example of FIG. 12, the width of the non-overlapping part NS21 is greater than the width of the non-overlapping part NS11. In other words, the non-overlapping part NS21 projects toward the signal line S2. The connector CT1 is apart from the signal line S1 in the first direction X with a gap DC16, and is apart from the signal line S2 in the first direction X with a gap DC17. A width Wc13 of the connector CT1 is greater than the width Wc11. The width of the non-overlapping part NS22 is greater than the width of the non-overlapping part NS12. In other words, the non-overlapping part NS22 projects toward the signal line S3. The connector CT2 is apart from the signal line S2 in the first direction X with a gap DC26 and is apart from the signal line S3 in the first direction X with a gap DC27. A width Wc23 of the connector CT2 is greater than the width Wc21. The advantages achieved in the above-described embodiment can be achieved in variation 7 as well.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first signal line positioned between a first pixel area and a second pixel area which are adjacent to each other in a first direction;
a first switching element disposed in the first pixel area, the first switching element including a first relay electrode disposed in the first pixel area in a same layer as the first signal line;
a second switching element disposed in the second pixel area, the second switching element including a second relay electrode disposed in the second pixel area in the same layer as the first signal line;
a first pixel electrode disposed in the first pixel area; and
a second pixel electrode disposed in the second pixel area, wherein
the first pixel electrode includes a first connector connected to the first relay electrode; a first branch, and a first body which extends along the first signal line from the connector and is connected to the first branch,
the second pixel electrode includes a second connector connected to the second relay electrode, a second branch, and a second body which extends along the first signal line from the connector and is connected to the second branch,
the first connector and the second connector are arranged in the first direction with the first signal line interposed therebetween,
the first connector is located between a first base of the first body and the first signal line,
a second base of the second body is located between the first signal line and the second connector,
a width of a first gap between the first connector and the first signal line is different from a width of a second gap between the first signal line and the second connector via the second base, and
a width of a third gap between the first relay electrode and the first signal line is different from a width of a fourth gap between the first signal line and the second relay electrode via the second base.

2. The display device of claim 1, wherein the width of the first gap is less than the width of the second gap.

3. The display device of claim 2, wherein the width of the third gap is less than the width of the fourth gap.

4. The display device of claim 1, wherein the width of the first gap is different from the width of the third gap.

5. The display device of claim 4, wherein the width of the first gap is less than the width of the third gap.

6. The display device of claim 1, wherein the width of the second gap is different from the width of the fourth gap.

7. The display device of claim 6, wherein the width of the second gap is less than the width of the fourth gap.

8. The display device of claim 1, wherein the first connector entirely overlaps the first relay electrode, and the second connector entirely overlaps the second relay electrode in plan view.

9. The display device of claim 8, further including a scan line extending in the first direction, a first part of the scan line comprising a gate electrode of the first switching element and a second part of the scan line comprising a gate electrode of the second switching element, wherein
the first relay electrode overlaps the scan line and the first connector overlaps the scan line and the first relay electrode, and
the second relay electrode overlaps the scan line and the second connector overlaps the scan line and the second relay electrode.

10. The display device of claim 1, wherein the first signal line includes a concave between the first relay electrode and the second relay electrode.

11. The display device of claim 10, wherein the first signal line has a first edge located at a side adjacent to the first pixel area and a second edge located at a side adjacent to the second pixel area, and the concave is provided at the second edge.

12. The display device of claim 11, wherein a width of a first part of the first signal line with the concave is less than a width of a second part of the first signal line which is other than the first part.

13. The display device of claim 10, wherein a convex is provided at the first edge in the first signal line, and the convex faces the concave.

14. The display device of claim 13, wherein a width of a first part of the first signal line with the concave and the convex is equal to a width of a second part of the first signal line which is other than the first part.

15. The display device of claim 1, wherein the first signal line includes a convex between the first relay electrode and the second relay electrode.

16. The display device of claim 15, wherein the first signal line has a first edge located at a side close to the first pixel area and a second edge located at a side close to the second pixel area, and the convex is provided at the first edge.

17. The display device of claim 16, wherein a width of a first part of the first signal line with the convex is greater than a width of a second part of the first signal line which is other than the first part.

18. The display device of claim 1, further comprising
a common electrode disposed to overlap at least the first branch of the first pixel electrode and the second branch of the second pixel electrode.

19. The display device of claim 18, wherein
the common electrode has a first opening in the first pixel and a second opening in the second pixel, and
the first connector is connected to the first relay electrode via the first opening and the second connector is connected to the second relay electrode via the second opening.

20. The display device of claim 19, wherein
the common electrode has a bridge line disposed above the first signal line, wherein the bridge line extends between the first opening and the second opening above the first signal line.

21. The display device of claim 1, wherein the second switching element is connected to the first signal line.

22. The display device of claim 1, wherein the second switching element is connected to the first signal line.

23. The display device of claim 1, further including
a common electrode disposed between a layer of the first and second pixel electrode and a layer of the first and second relay electrode, the common electrode having an opening through which the first connector connects the first relay electrode and the second connector connects the second relay electrode.

24. The display device of claim 23, wherein
the second base of the second pixel electrode is located in the opening.

* * * * *